United States Patent
Mitchell et al.

[11] 3,771,356
[45] Nov. 13, 1973

[54] VIBRATION MEASURING ASSEMBLIES FOR ENERGIZED AND NON-ENERGIZED POWER LINE VIBRATION MEASUREMENTS

[75] Inventors: James Mitchell, Regina; Douglas Austin Bassett, Saskatoon, Saskatchewan; David George Glass, Saskatoon, Saskatchewan; Larry Allan Rodney Hoffman, Saskatoon, Saskatchewan; William Leslie Arnold Postle, Saskatoon, Saskatchewan; Dennis William Johnson, Saskatoon, Saskatchewan, all of Canada

[73] Assignee: Saskatchewan Power Corporation, Regina, Saskatchewan, Canada

[22] Filed: Mar. 14, 1972

[21] Appl. No.: 234,599

[52] U.S. Cl.......... 73/71.5 R, 73/DIG. 1, 33/148 D
[51] Int. Cl. ........................................... G01n 29/00
[58] Field of Search.................. 33/148 D, DIG. 13; 73/144, 105, 71.5, 170 A

[56] References Cited
UNITED STATES PATENTS

| 2,487,681 | 11/1949 | Weisselberg | 201/63 |
| 2,761,216 | 9/1956 | Gollub | 33/147 |
| 3,610,038 | 10/1971 | Joy et al. | 73/170 A |
| 3,381,527 | 5/1968 | Grubbs | 73/144 |
| 3,675,471 | 7/1972 | Bouche | 73/67 |

*Primary Examiner*—Richard C. Queisser
*Assistant Examiner*—Arthur E. Korkosz
*Attorney*—Stanley G. Ade

[57] ABSTRACT

A single point constant contact assembly is mounted on one end of a resilient cantilever beam either adjacent to or remote from an aerial conductor suspension clamp. The other end of the cantilever beam has bonded to it strain gauges to monitor deflections occurring in the conduits and these deflections are then amplified and transmitted to a remotely situated receiver station.

8 Claims, 11 Drawing Figures

PATENTED NOV 13 1973 3,771,356

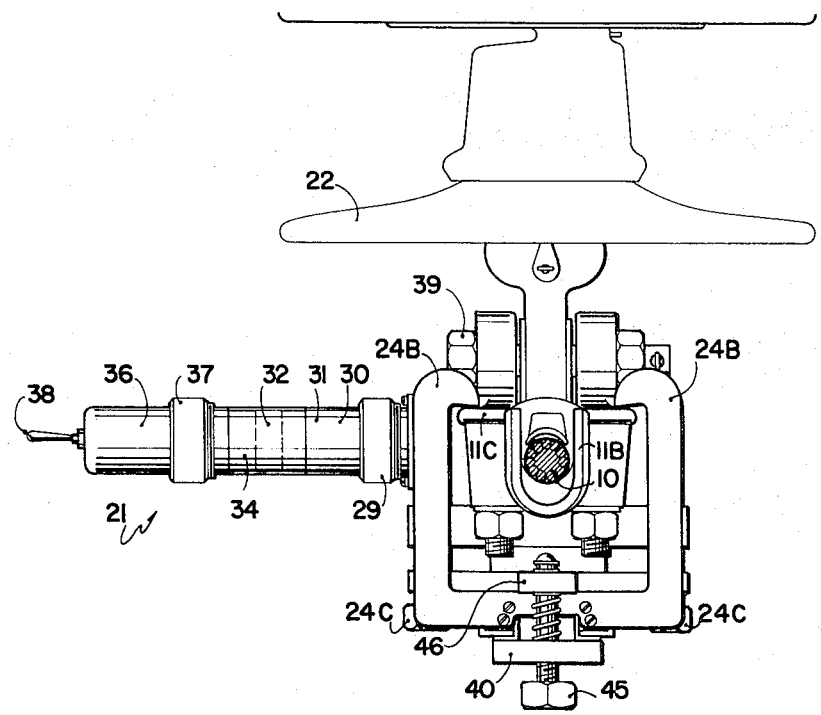
FIG. 3A
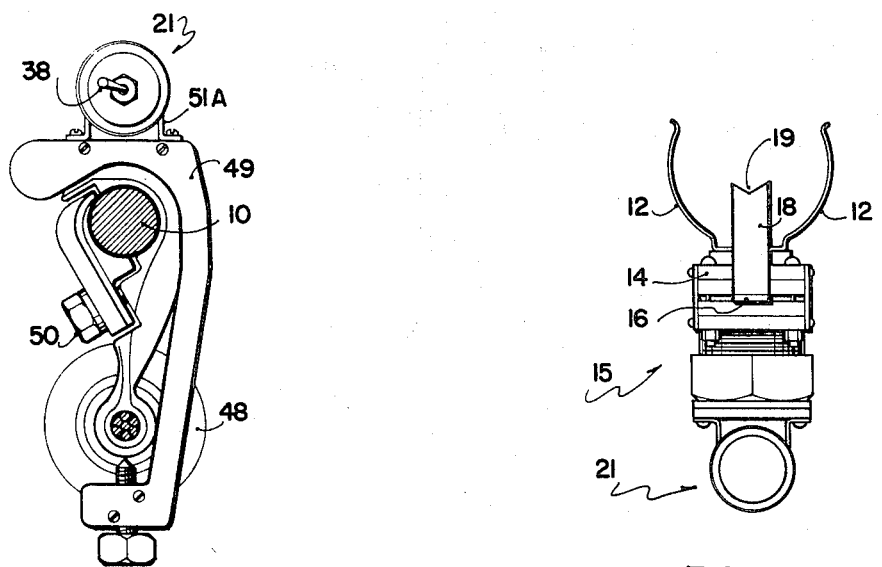
FIG. 4A
FIG. 1A

VIBRATION MEASURING ASSEMBLIES FOR ENERGIZED AND NON-ENERGIZED POWER LINE VIBRATION MEASUREMENTS

BACKGROUND OF THE INVENTION

This invention relates to new and useful improvements in vibration measuring equipment particularly designed for use with power lines and supporting structure and useable on either non-energized lines or energized lines.

It is well known that aerial transmission lines will vibrate if exposed to the proper wind conditions and as a result of prolonged vibration, it is possible for the material making up the transmission line conductor to fail due to fatigue. However, it can also be shown, that if the magnitude of vibration can be reduced to a small value, an indefinite life for the conductor can be expected.

In order to determine whether a conductor is experiencing vibration beyond its endurance limit or not, it is necessary to measure the relative magnitude of movement between the conductor itself and its point of support; in most cases this would be its suspension clamp and laboratory and field tests have shown that the conductor suspension clamp itself articulates due to the varying wind effects on adjacent spans.

Due to this articulating action, inertial forces are set up between the clamp and conductor. It is therefore important to keep these forces at a minimum so that the induced bending of the conductor by this effect is minimized. The use of light-weight clamps with low friction pivots considerably reduces induced bending.

Several methods are used to record vibration for vibration analysis, the most popular being the live line recorder. However, unfortunately, this instrument has been shown to alter the system due to its relatively high weight which is approximately 18 pounds.

SUMMARY OF THE INVENTION

The present invention overcomes disadvantages inherent with current systems and devices and utilizes a single point constant contact assembly mounted upon the end of a spring steel cantilever beam which in turn has bonded to it strain gauges. A cantilever pre-load adjustment screw is used. The deflections monitored by the strain gauge are amplified and either transmitted to a remote receiving unit or, alternatively, connected thereby by means of a direct cable, it being understood that the direct cable method can be used when the line being measured is non-conductive but that the transmitter system is required if the line is energized.

The system is designed around a miniature Frequency Modulated FM/FM radio transmitter having a range of between 200 and 500 feet and may be battery operated or can have facilities to work directly from a current pick-up on A.C. energized lines.

The basic transmitting unit consists of a strain gauge bridge or potentiometer circuit, programmed timer, strain gauge preamplifier sub carrier oscillator and F.M. transmitter. By adding additional sub carrier oscillators to the basic unit, several sensing points can be monitored either at the suspension point or on "in span" hardware, e.g., dampers and spacers, etc.

The ground receiving station is contained in a well insulated cabinet which houses an F.M. receiver with one or more discriminators, together with a speed compensated magnetic tape recorder, high speed hot pen or similar chart recorder. A suitable controller regulates the cabinet temperature of 70° F based on −60° F ambient. All power is derived from 12 volt car type batteries, although propane or similar gas may be used to supply internal cabinet heating for a longer service life.

The service life of the complete unit using batteries only for transmitter power is 24 hours continuous or 4 weeks intermittent, e.g. if programmed for 5 seconds on 5 minutes off. However, if the transmitter is line powered, continuous operation is possible.

The main feature of the device is its light weight (approximately 3 pounds). As mentioned previously the method of sensing vibrations is through a small preloaded spring steel cantilever beam with associated bonded strain gauges.

Of importance is the fact that no clamping is involved at the point of cable contact in order that the cable departure angle may vary unrestricted with temperature changes.

It is common practice to use radio telemetry systems to transmit data from inaccessible locations to more favorable locations. Of the many possible forms of telemetry systems only a few are used extensively. One of the most useful is the FM/FM system in which the data to be transmitted frequency modulates a sub carrier oscillator (usually in the audio frequency range) and the output from this oscillator frequency modulates a transmitter. One advantage of this system arises from the fact that the accuracy is dependent only on the sub carrier oscillator. Imperfections in the transmitter such as drift, non-linearity, etc. do not degrade the data. Since it is usually easier to build precision circuits at audio frequencies than it is at radio frequencies, the use of a sub carrier oscillator generally results in improved accuracy.

There are a multiplicity of sub carrier oscillator circuits reported in the literature, most of which were designed for specific applications. They often have special features that make them suitable for their intended usage. By the same token, other features may have been sacrificed or compromised to achieve the performance desired.

In the measurement of power line vibrations, the features which are important are:

1. High accuracy.
2. Ability to operate from a single unregulated low voltage supply.
3. High degree of insensitivity to temperature over the range that might be expected during summer operation in the desert to winter operation in the artic.
4. Simplicity to facilitate packaging in a small volume.
5. Very low power consumption.

The present invention enables this combination of features to be realized in a relatively simple and economical manner.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

FIG. 1A is an end view of the clamp assembly of FIG. 1.

FIG. 3A is an end view of FIG. 3.

FIG. 4A is an end view of FIG. 4.

In the drawings like characters of reference indicate corresponding parts in the different drawings.

DETAILED DESCRIPTION

Figure 1:
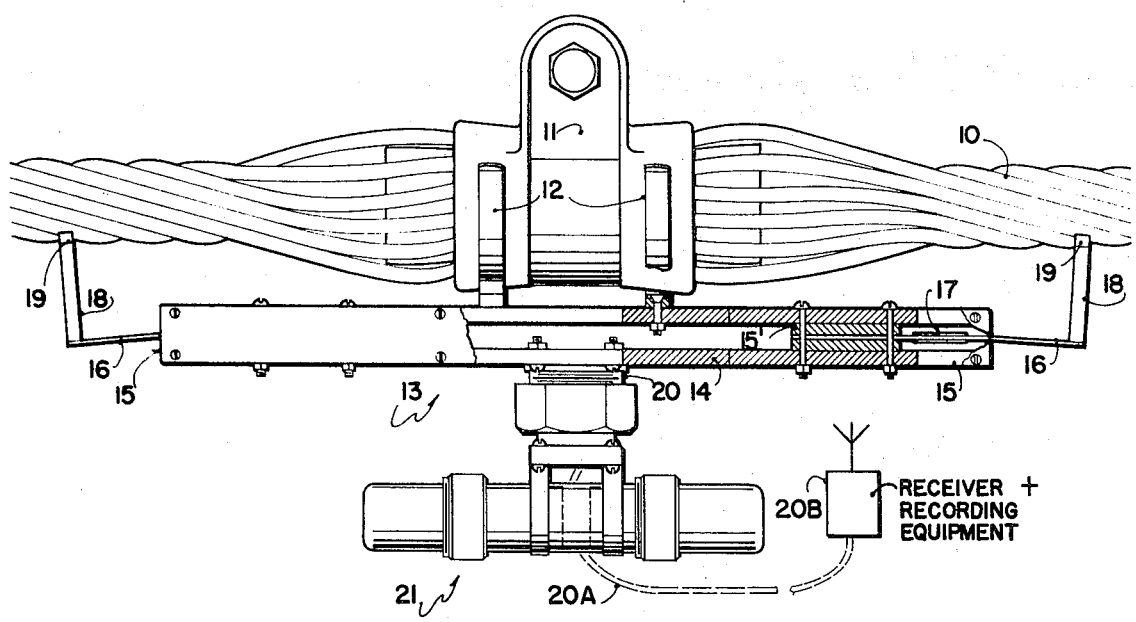
FIG. 1 is a side elevation of one embodiment utilizing either a cable connection or an FM/FM transmitter and illustrating a dual beam strain gauge transducer system.

Proceeding therefore to describe the invention in detail, reference should first be made to FIG. 1 in which 10 illustrates an overhead line normally suspended between pylons (not illustrated) and being either energized or non-energized.

A cable clamp 11 is engaged with the line 10 by which the line may be suspended from a pylon support (not illustrated) in the usual way.

Situated below this clamp and secured thereto by means of spring clip assemblies 12 is a strain gauge assembly collectively designated 13. In FIG. 1, a dual beam type strain gauge assembly is shown and consists of a casing or holder including pair of spaced and parallel mounting plates 14 maintained in the spaced and parallel relationship by various spacers 15' and the like.

Situated at each end of the plates 14 is a strain gauge unit collectively designated 15. Each of these units includes a resilient spring steel cantilever beam 16 clamped between spacers 15' and having conventional strain gauges 17 bonded to the beam 16 just outboard of the point of anchorage between spacers 15'.

A contact member 18 extends at right angles from the extremities or distal ends of the beam 16 and the upper ends 19 of these contact members is V-shaped as shown at 19 so that it can engage the underside of the line or cable 10 as clearly illustrated in FIG. 1.

The positioning of the device is such that the beams 16 are under slight tension so that any deflection of the cable or line 10 relative to the clamp 11 will show up at the strain gauges 17.

Figure 5:
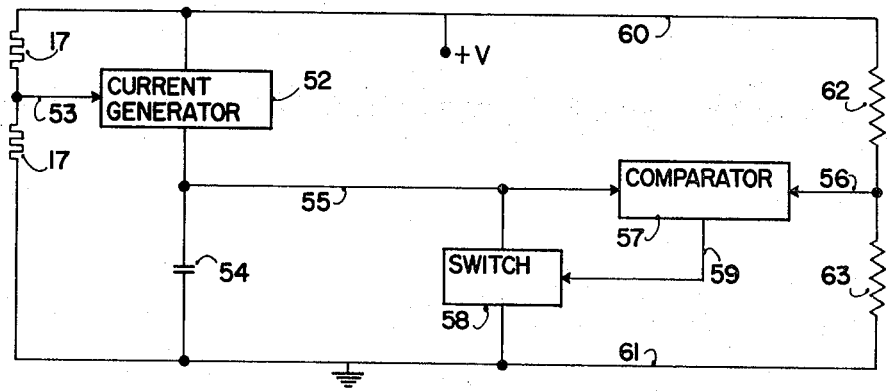
FIG. 5 is a block diagram of a sub carrier oscillator utilized in this invention.
Figure 7:
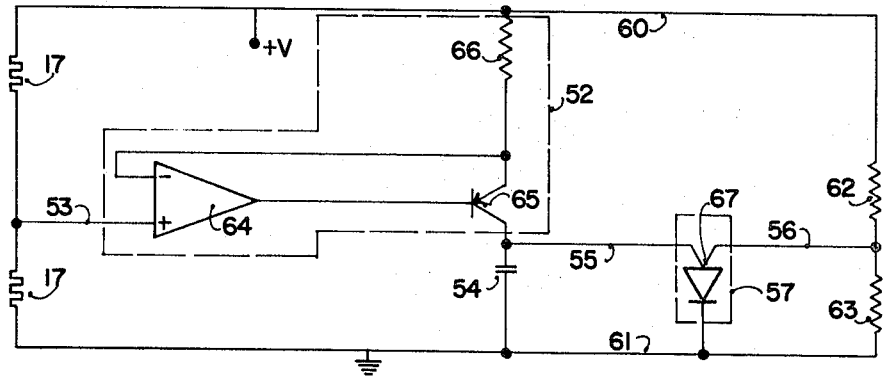
FIG. 7 shows a schematic diagram of one oscillator circuit.
Figure 8:
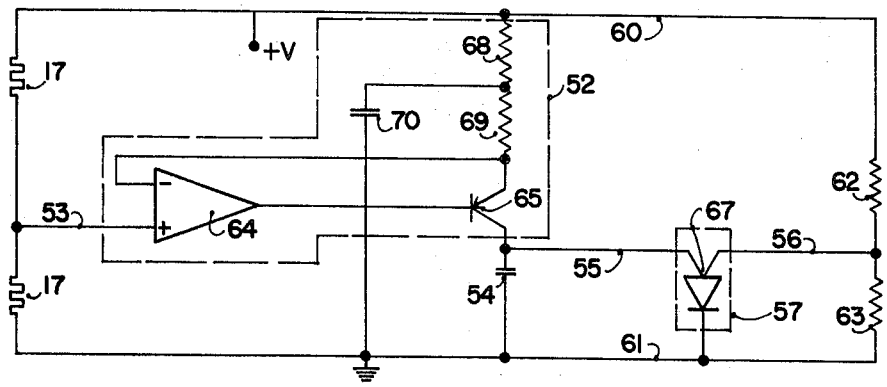
FIG. 8 shows a similar oscillator cirucit with increased deviation sensitivity.

Electrical connections are made between the strain gauges 17 and an outlet point 20 on the mounting plates 14, but these are not shown in FIG. 1 but only schematically in FIGS. 5, 7 and 8.

FM transmitter collectively designated 21 may be secured to the outlet point 20 or, alternatively, a cable may be connected thereto and extend to ground as will hereinafter be described. This cable is shown in phantom in FIG. 1 and identified by reference numeral 20A.

In FIG. 1, an "armour grip suspension unit" clamp is shown very similar to the clamp illustrated in FIG. 1 and identified in this instance by reference character 11A and this clamp is shown attached to the pylon support illustrated generally by reference character 22.

In this particular embodiment, the strain gauge assembly 13A consists of a beam holder in the form of a tube 23 pivotally secured to bracket assembly 24 depending from the clamp 11A by means of pivot assembly 24'.

The resilient spring steel beam 16 is mounted within a Mu-metal shield ring 25 which in turn is secured to the end of the beam holder 23 and this spring steel beam is held within the end of the beam holder by clamp means (not illustrated). Bonded strain gauges 17 are provided just outboard of the point of anchorage of the beam 16 and a single point constant contact assembly 26 extends upwardly from the beam 16 and contacts the underside of the associated cable on line 10.

A small bracket 27 extends from the supporting bracket 24 and a screw threaded adjustment bolt 28 engages this bracket and a pad on the underside of the beam holder 23 providing cantilever pre-load adjustment.

Secured to the other end of the holder 23 by means of screw ring 29 is the transmitter 21 and various contact pins within the end of the transmitter (not illustrated) connect with electrical conduits extending from the strain gauges 17.

Figure 2:
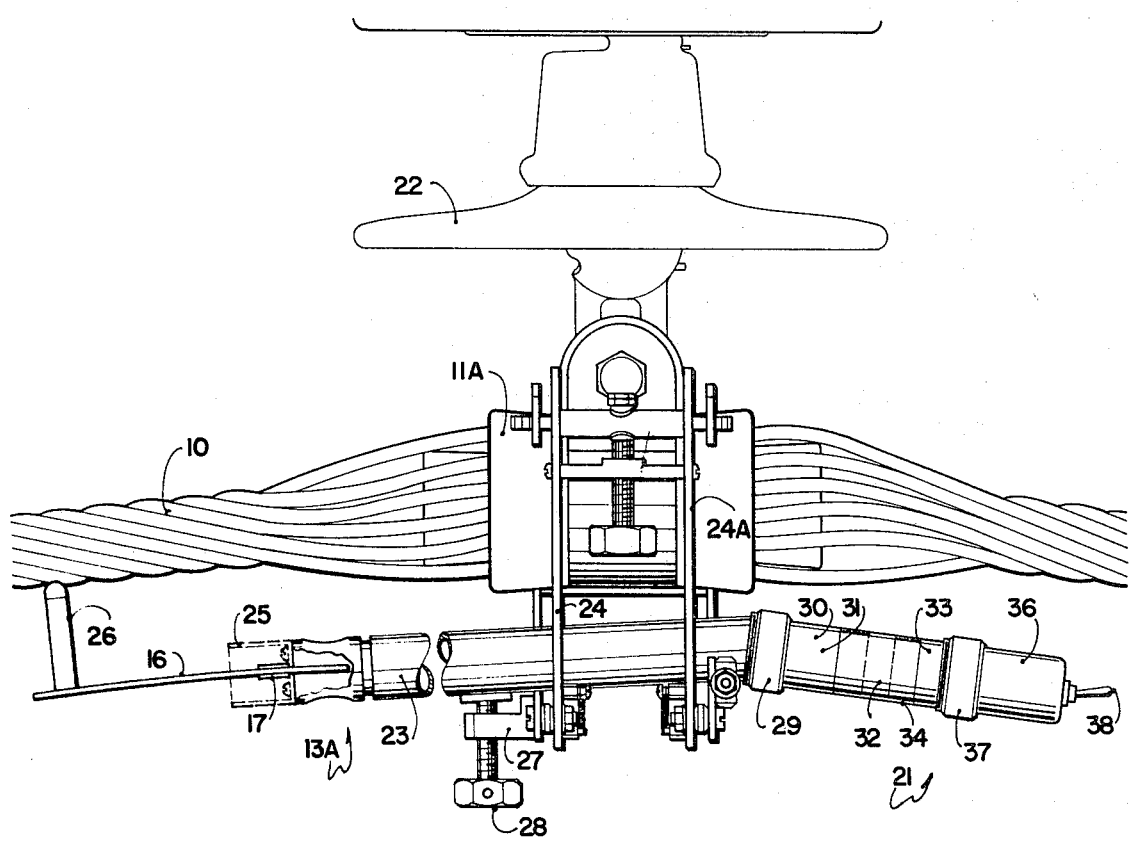
FIG. 2 is a side elevation of a further embodiment showing the transmitter and also showing the device in use with an "armour grip suspension unit".

Within the transmitter but not illustrated in FIG. 2 is a strain gauge preamplifier 30 and situated just behind that is a transmitter in the area indicated by reference character 31.

An antenna coil is situated approximately at 32 and a multiplex unit, if used, would be situated at 33. All of these components are situated within a plexiglas support tube 34 and a battery compartment 36 is screw threadably secured to the end by means of attaching ring 37.

A two position switch 38 is provided within the end enabling the operator to set the device for intermittent or continuous operation. However, as the electrical connections of such an assembly are conventional, it is not deemed necessary to illustrate and describe same further.

Referring back to the brackets 24, it should be appreciated that these are secured to the suspension unit 11A at the upper ends thereof and that the bracket body portions 24A curve outwardly and around the clamp or suspension unit 11A with the strain gague assembly 13A being supported from the lower ends of these bracket body portions.

Figure 3:
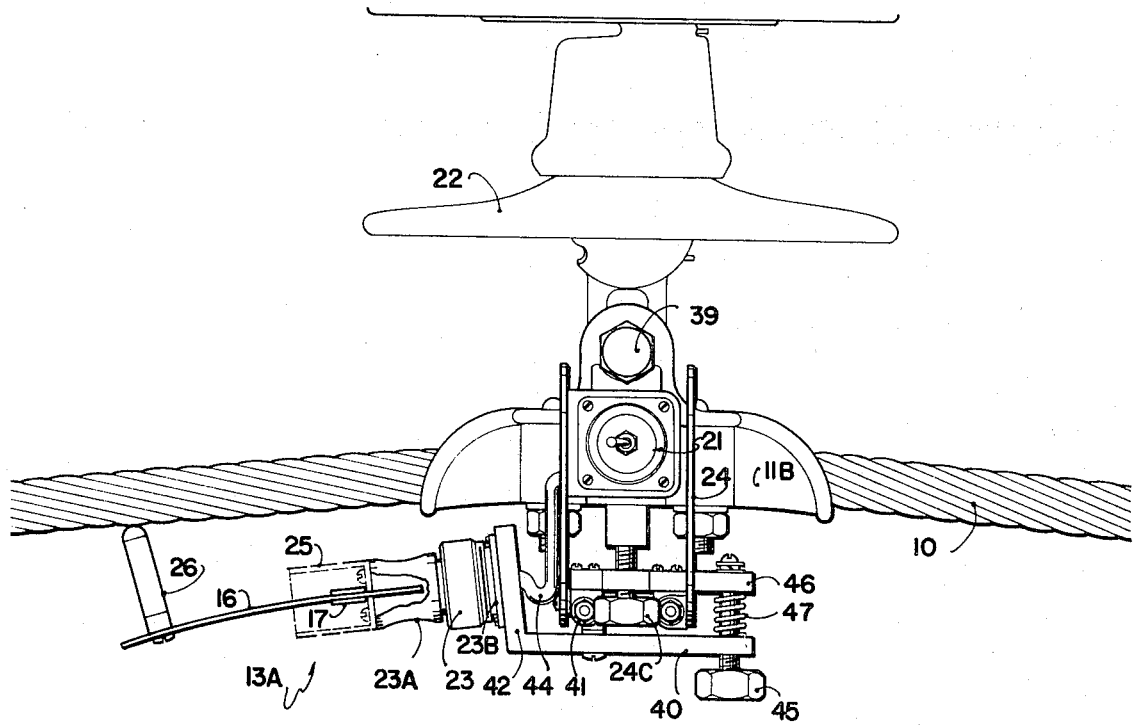
FIG. 3 is a side elevation of a further embodiment showing the device in use with a standard suspension clamp.

FIG. 3 shows a similar arrangement but with a standard suspension clamp 11B carrying the line or cable 10. Once again this suspension clamp is supported by means of a pivot bolt 39 from a pylon support member 22.

The transmitter bracket assembly 24 is secured by the upper ends thereof to the bracket assembly 11B as shown in FIG. 3A. This bracket assembly includes a U-shaped member with inwardly curved upper ends 24B engageable upon shoulders 11C of the bracket 11B. Clamp screws 24C cooperate between the U-shaped member and the underside of bracket 11B to clamp the bracket assembly to the bracket. A strain gauge support bracket 40 is pivoted to the lower ends of these transmitter bracket assemblies by transverse pivot assembly 41.

This strain gauge bracket 40 includes an upwardly extending portion 42 with the strain gauge support tube 23A being connected to a connector 23B by means of a connecting ring 43. The makeup of the strain gauge assembly is similar to that described for FIG. 2 so that similar reference characters have been given.

A transducer cable 44 extends from the strain gauges to the transmitter 21 which in this case extends at right angles to the line 10 and is secured to one side of the bracket 24 as clearly shown in FIG. 3A. Once again the makeup of the transmitter is similar to that hereinbefore described so that similar reference characters have been given.

In the embodiment shown in FIG. 3, there is a cantilever pre-load adjustment screw 45 screw threadably engaging through one end of the bracket 40 and bearing against a fixed portion 46 extending from the bracket 24. A compression spring 47 reacts between the part 46 and the bracket 40.

By adjusting the screw, the cantilever beam 16 can be pre-loaded as clearly shown, it being understood that the bracket 40 is pivotally supported at 41.

Figure 4:
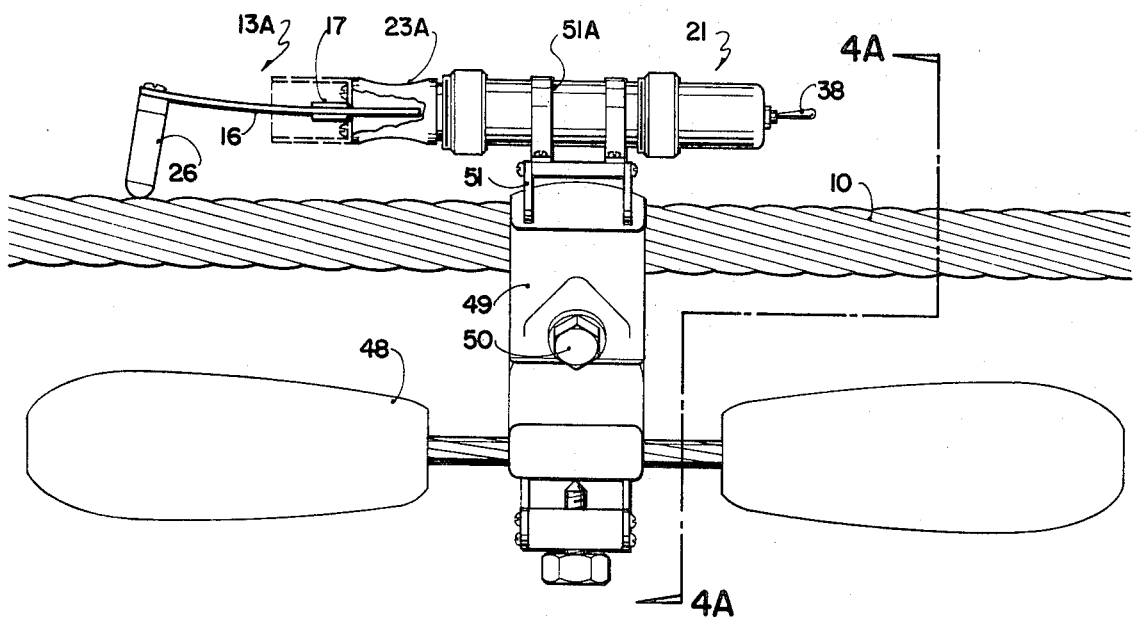
FIG. 4 is a side elevation showing an embodiment with the device in use with a vibration control damper.

In FIGS. 4 and 4A, the device is shown in conjunction with a vibration control damper assembly 48 which is conventional in construction. A clamp 49 extends around the cable 10 and the damper assembly 48 is secured thereto by means of clamp bolt 50. Although the vibration damper is only shown in FIG. 4, it should be appreciated that a similar device can be incorporated with the other embodiments.

A transmitter bracket assembly 51 is secured to clamp member 49 and extends upwardly therefrom and the transmitter 21 is held within the transmitter clamps 51A and lies parallel to the line or cable 10.

A strain gauge assembly 13A is similar to that described previously except that the member 26 engages the upper surface of the line or cable 10. Inasmuch as the operation of this embodiment is similar to those previously described, it is not believed necessary to give further details.

FIGS. 5 to 8 inclusive show details of the transmitter design which includes the sub carrier oscillator hereinbefore described.

The measuring system data is generated by the pair of strain gauges 17 as hereinbefore described and these are connected as shown in the schematic block diagram of FIG. 5. 52 illustrates a current generator producing a current proportional to the voltage across strain gauges 17 and in normal operation the voltage on the connecting line 53 is determined by the resistance value of the two strain gauges 17 as illustrated. This voltage controls the current generator 52 producing a current which charges capacitor 54. As the voltage on line 55 increases, it is continuously compared with the voltage on line 56 by means of the caparator 57. When the voltage on line 55 equals the voltage on line 56, the comparator closes switch 58 momentarily by means of a signal on line 59 extending from the comparator 57.

During the time that switch 58 is closed, it discharges capacitor 54 to its original state. As soon as switch 58 opens, the current flowing into the capacitor starts the cycle over again.

Figure 6:
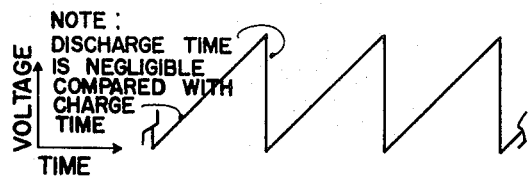
FIG. 6 is a wave form of the voltage across the capacitor.

The voltage across the capacitor is a triangular wave as shown in FIG. 6 and may be used as the output signal.

Reference character 60 illustrates the power supply line and 61 is the ground or common line with resistors 62 and 63 in circuit as shown.

The salient features may be seen most easily when the circuit is analyzed in terms of its parameters.

If
 $e_s$ is the voltage on line 53
 $i$ is the current produced by the current generator 52
 $V$ is the supply voltage
 $R_1$ is the resistance of strain gauge 17A
 $R_2$ is the resistance of strain gauge 17B
 $R_{10}$ is the resistance of resistor 62
 $R_{11}$ is the resistance of resistor 63
 $C$ is the capacitance of capacitor 54
 $e_r$ is the voltage of mid-point of resistors 62 and 63
 $e_c$ is the instantaneous voltage across capacitor 54
 $K$ is the constant of proportionality relating the current to its control voltage $e_s$
 $t$ is time measured from the instant at which the switch 58 opens
 $T$ is the period of oscillation Then $$e_s = R_1/(R_1 + R_2) V$$
$$i = K R_1 V/(R_1 + R_2)$$

At time $$t = T$$

$$e_c = \frac{1}{C}\int_0^T i\,dt = \frac{KR_1VT}{C(R_1+R_2)}$$

and $$e_c = e_r = R_{11}/(R_{10} + R_{11})$$

Therefore:

$$R_{11}V/(R_{10} + R_{11}) = KR_1VT/C(R_1 + R_2)$$

From which the frequency of oscillation is given by:

$$f = 1/T = KR_1/C(R_1 + R_2) \cdot (R_{10} + R_{11})/R_{11}$$

It will be appreciated that the factor $R_1/(R_1 + R_2)$ varies linearly with the strain being experienced by the strain gauges. Also, since the factors $K$, $C$, $R_{10}$ and $R_{11}$ are constants for any given circuit this expression may be simplified to the form $$f = ks + f_c$$

in which
 $k$ is a constant
 $s$ is the strain being measured and hence constitutes the data signal
 $f_c$ is the frequency of oscillation with no strain on the strain gauges It is important to note that the expression is independent of supply voltage. The only variable affecting the frequency of oscillation is the data itself. Hence the sub carrier oscillator is modulated in the desired manner.

It will also be appreciated that there are several ways in which this invention can be embodied in a physical system.

By way of illustration the circuit shown schematically in FIG. 7 gives one embodiment of the invention.

In this circuit the current generator is composed of operational amplifier 64, transistor 65 and resistor 66. The comparator is a programmable uni-junction transistor 67. The strain gauges 17A and 17B, capacitor 54 and resistors 62 and 63 are the same as shown in FIG. 5.

The analysis of the basic circuit may be extended to this embodiment to show that the desirable features have been incorporated.

Subject to the approximations that:
a. the collector current and emitter current of transistor 64 are equal;
b. the operational amplifier 64 has essentially infinite input impedance and gain;
c. the programmable uni-junction transistor 67 discharges the capacitor whenever the voltage across the capacitor rises to a value equal to that at the mid-point of resistors 62 and 63.

The expression for the frequency of oscillation becomes:

$$f = (R_{10} + R_{11})/R_s \, C \, R_{11} \, (R_1)/R_1 + R_2$$

which is the same form obtained previously.

In actual usage it has been found desirable to modify the circuit slightly to make it more sensitive to variations in the ratio of $R_1/(R_1 + R_2)$ This has been accomplished by replacing resistor 66 with two resistors 68 and 69 and having their common point bypassed to ground with a large capacitor 70. This variation is shown in FIG. 8.

The modification enables wide frequency variations to be obtained from rather small changes in the ratio of $R_1/(R_1 + R_2)$. For example, power line vibration which changes the value of $R_1/(R_1 + R_2)$ by ± 1 percent from its average value is used to modulate the frequency of oscillation by ± 40 percent about its average value. None of the immunity to power supply changes is sacrificed.

The improvements made by this circuitry may be summarized as follows:

1. A frequency modulated oscillator in which resistance strain gauges are used as an integral part of the oscillator to deviate the oscillator frequency proportional to the strain being experienced by the strain gauges.
2. An oscillator in which the strain gauges form part of a current generator circuit which produces a current which varies linearly with the strain experienced by the strain gauge.
3. An oscillator in which the current from the current generator charges a capacitor until it reaches a predetermined reference potential at which time the capacitor is rapidly discharged by some other device.
4. An oscillator in which the strain gauges, current generator and reference potential all derive their operating voltage from the same voltage supply such that variations in the voltage supply have no effect on the frequency of oscillation of the oscillator.

The signals from the oscillator circuits are fed to the transmitter 31 and then either to the aerial coil at 32 or to the cable 20A. In either case the signal is picked up by the receiver/recorder shown schematically at 20B in FIG. 1. This receiver is conventional and is housed in an insulated cabinet as described in the preamble of this application.

Various modifications may be constructed or performed within the scope of the inventive concept disclosed. Therefore what has been set forth is intended to illustrate such concept and is not for the purpose of limiting protection to any herein particularly described embodiment thereof.

What we claim as our invention is:

1. A live line vibration measuring assembly for use with energized and non-energized aerial cables and the like which are supported at spaced intervals by pylons which include pylon support members; said assembly including a casing detachably secured to said cable, a strain gauge assembly in said casing, said strain gauge assembly including a strain gauge unit comprising a resilient cantilever beam secured by one end thereof within said casing and extending therefrom, strain gauges bonded upon each side of said beam adjacent said one end, a cable contact member on the other end of said beam in single constant contact with the surface of said cable and lying parallel to the run of said cable whereby the force generated by the contact of said member with said surface is parallel to the longitudinal axis of said beam thereby causing said beam to deflect, a transducer in said casing electrically connected to said strain gauges to receive signals generated by said strain gauges, remote signal receiving means and means operatively connecting said transducer to said remote signal receiving means.

2. The vibration measuring assembly according to claim 1 in which said means to support said casing includes a support bracket secured to the associated pylon support member, said casing being detachably clamped to said support bracket and means to preload said cantilever beam with reference to the associated cable.

3. The assembly according to claim 2 in which said last mentioned means includes means pivotally mounting said casing to said support member, a bracket extending from said casing and screw threaded bolt means engaging said bracket and said casing to vary the contact pressure of said cable contact member with said cable.

4. The assembly according to claim 2 in which said support bracket includes a horizontal portion pivotally secured adjacent one end thereof to said support member, an angulated portion formed on the other end of said support bracket, said strain gauge assembly being secured to said angulated portion, and spring loaded, screw threadable bolt means engaging said one end of said support bracket and reacting upon said support member to vary the contact pressure of said cable contact member with said cable, thereby preloading said cantilever beam with reference to the associated cable.

5. The vibration measuring assembly according to claim 1 in which said means operatively connecting said signals generated by said strain gauges to said signal receiving means includes a frequency modulated transmitter in said casing and a source of power for said transmitter, said transmitter including a sub-carrier oscillator, said sub-carrier oscillator including a current generator operated by said strain gauges, the current from said generator varying linearly with the strain experienced by said strain gauges, a compacitor in series with the output of said current generator and chargeable thereby with a predetermined reference potential, a source of voltage supply common to said strain gauges, said current generator and said reference potenial of said capacitor, a comparator in series between said capacitor and said source of voltage supply whereby one signal is provided for comparison purposes by said condenser and the other signal is provided for comparison purposes by said source of voltage supply, and electronic switch means operated by said comparator to discharge said capacitor when said signals are substantially equal, said oscillator output signal being connected to said transmitter.

6. The vibration measuring assembly according to claim 2 in which said means operatively connecting said signals generated by said strain gauges to said signal receiving meas includes a frequency modulated transmitter in said casing and a source of power for said transmitter, said transmitter including a sub-carrier oscillator, said sub-carrier oscillator including a current generator operated by said strain gauges, the current from said generator varying linearly with the strain experienced by said strain gauges, a compactor in series with the output of said current generator and chargeable thereby with a predetermined reference potential, a source of voltage supply common to said strain gauges, said current generator and said reference potential of said capacitor, a comparator in series between said capacitor and said source of voltage supply whereby one signal is provided for comparison purposes by said condenser and the other signal is provided for comparison purposes by said source of voltage supply, and electronic switch means operated by said comparator to discharge said capacitor when said signals are substantially equal, said oscillator output signal being connected to said transmitter.

7. The vibration measuring assembly according to claim 3 in which said means operatively connecting said signals generated by said strain gauges to said signal receiving means includes a frequency modulated transmitter in said casing and a source of power for said transmitter, said transmitter including a sub-carrier oscillator, said sub-carrier oscillator including a current generator operated by said strain gauges, the current from said generator varying linearly with the strain experienced by said strain gauges, a compactor in series with the output of said current generator and chargeable thereby with a predetermined reference potential, a source of voltage supply common to said strain gauges, said current generator and said reference potential of said capacitor, a comparator in series between said capacitor and said source of voltage supply whereby one signal is provided for comparison purposes by said condenser and the other signal is provided for comparison purposes by said source of voltage supply, and electronic switch means operated by said comparator to discharge said capacitor when said signals are substantially equal, said oscillator output signal being connected to said transmitter.

8. The vibration measuring assembly according to claim 4 in which said means operatively connecting said signals generated by said strain gauges to said signal receiving means includes a frequency modulated transmitter in said casing and a source of power for said transmitter, said transmitter including a sub-carrier oscillator, said sub-carrier oscillator including a current generator operated by said strain gauges, the current from said generator varying linearly with the strain experienced by said strain gauges, a capacitor in series with the output of said current generator and chargeable thereby with a predetermined reference potential, a source of voltage supply common to said strain gauges, said current generator and said reference potential of said capacitor, a comparator in series between said capacitor and said source of voltage supply whereby one signal is provided for comparison purposes by said source of voltage supply, and electronic switch means operated by said comparator to discharge said capacitor when said signals are substantially equal, said oscillator output signal being connected to said transmitter.

* * * * *